(12) United States Patent
Nakashima et al.

(10) Patent No.: US 7,969,054 B2
(45) Date of Patent: Jun. 28, 2011

(54) SUPERCONDUCTIVITY UTILIZING SUPPORT MECHANISM, AND PERMANENT MAGNET UTILIZING SUPPORT MECHANISM

(75) Inventors: Hiroshi Nakashima, Hachioji (JP); Eiji Suzuki, Kunitachi (JP); Michiaki Kubota, Ichinomiya (JP); Yuichi Kozuma, Tokyo (JP)

(73) Assignee: Central Japan Railway Company, Nagoya (JP)

( * ) Notice: Subject to any disclaimer, the term of this patent is extended or adjusted under 35 U.S.C. 154(b) by 662 days.

(21) Appl. No.: 11/920,619

(22) PCT Filed: Jan. 30, 2006

(86) PCT No.: PCT/JP2006/301482
§ 371 (c)(1),
(2), (4) Date: Nov. 19, 2007

(87) PCT Pub. No.: WO2006/126307
PCT Pub. Date: Nov. 30, 2006

(65) Prior Publication Data
US 2010/0013581 A1 Jan. 21, 2010

(30) Foreign Application Priority Data

May 23, 2005 (JP) .................................. 2005-149612

(51) Int. Cl.
*H02K 7/09* (2006.01)
(52) U.S. Cl. ...................................... 310/90.5; 310/208
(58) Field of Classification Search .................. 310/90.5, 310/208
See application file for complete search history.

(56) References Cited

U.S. PATENT DOCUMENTS

| 5,159,219 | A | * | 10/1992 | Chu et al. ..................... 310/90.5 |
| 5,177,387 | A | * | 1/1993 | McMichael et al. ......... 310/90.5 |
| 5,319,275 | A | * | 6/1994 | Tozoni ......................... 310/90.5 |
| 5,455,706 | A | * | 10/1995 | Brotz ......................... 359/198.1 |
| 5,757,098 | A | * | 5/1998 | Higuchi et al. .............. 310/90.5 |
| 5,763,971 | A | * | 6/1998 | Takahata et al. ............. 310/90.5 |

FOREIGN PATENT DOCUMENTS

| DE | 103 38 641 A1 | 3/2005 |
| JP | 62-085216 | 4/1987 |
| JP | 63-167119 | 7/1988 |
| JP | 01-202183 | 8/1989 |
| JP | 2001-343020 | 12/2001 |
| JP | 2004-331241 | 11/2004 |

OTHER PUBLICATIONS

Notice of Reason(s) for Rejection mailed Aug. 5, 2008, issued on the corresponding Japanese patent application No. 2005-149612 and its translation.

(Continued)

*Primary Examiner* — Thanh Lam
(74) *Attorney, Agent, or Firm* — Edwards Angell Palmer & Dodge LLP

(57) ABSTRACT

A superconductivity utilizing support mechanism comprises a superconductive coil and a ferromagnetic body. One of the ferromagnetic body, so constituted as to slide in a direction of a center axis of the superconductive coil, and the superconductive coil, so constituted as to slide in a direction of the center axis thereof, is floated and supported relative to the other by axial magnetic attraction caused by a center plane of the superconductive coil and a center plane of the ferromagnetic body moving apart from each other.

3 Claims, 6 Drawing Sheets

OTHER PUBLICATIONS

H. Kameno et al., "Application of Active Magnetic Bearings for Helium-Cold Compressor," KOYO Engineering Journal No. 158, 2000, pp. 16-20.

H. Kameno et al., "Rotation Loss Characteristics of High-Tc Superconducting Magnetic Bearings," KOYO Engineering Journal No. 156, 1999, pp. 9-14.

R. Takahata et al., "Trial Manufacturing of 0/2k Wh Class Flywheel Rotor Supported by Superconducting Magnetic Bearing for Energy Storage System," KOYO Engineering Journal, No. 151, 1997, pp. 12-16.

Notice of Reason(s) for Rejection dated Jan. 8, 2008 from a foreign patent office, issued in the corresponding Japanese patent application and its English translation.

International Preliminary Report on Patentability and Written Opinion of the International Searching Authority for PCT/JP2006/301482, Jan. 30, 2006.

Supplementary European Search Report for European Application No. EP 06712625.0 dated Mar. 15, 2011.

* cited by examiner

[CONTROL TYPE MAGNETIC BEARING]

[BEARING UTILIZING SUPERCONDUCTIVE BULK AND PERMANENT MAGNET]

SUPERCONDUCTIVITY UTILIZING SUPPORT MECHANISM, AND PERMANENT MAGNET UTILIZING SUPPORT MECHANISM

TECHNICAL FIELD

This invention relates to a mechanism for floating and supporting a rotor and a movable body by utilizing superconductivity and a permanent magnet.

BACKGROUND ART

A control type magnetic bearing is known as the most general type of a non-contact thrust bearing. For example, there is a control type magnetic bearing so constituted as to support a rotor by a bearing that utilizes an electromagnet as shown in FIG. 5(a), or a control type magnetic bearing having a constitution as disclosed in Non-Patent Literature 1. There is also a bearing that utilizes superconductivity. The bearing developed utilizes superconducting bulk and a permanent magnet. For example, there is a bearing provided with a permanent magnet under a rotor, and the permanent magnet is disposed to face superconducting bulk, as shown in FIG. 5(b) (see also Patent Literature 1). There are also bearings having a constitution as disclosed in Non-Patent Literatures 2 and 3.

Non-Patent Literature 1: "KOYO Engineering Journal No. 158 (2000)", KOYO SEIKO CO., LTD., printed on Jul. 23, 2000), pages 16 to 20

Patent Literature 1: Unexamined Japanese Patent Publication No. 2001-343020

Non-Patent Literature 2: "KOYO Engineering Journal No. 156 (1999)", KOYO SEIKO CO., LTD., pages 9 to 14

Non-Patent Literature 3: "KOYO Engineering Journal No. 151 (1997)", KOYO SEIKO CO., LTD., pages 12 to 16

DISCLOSURE OF THE INVENTION

Problems to be Solved by the Invention

There are problems as below in these types of thrust bearings. For example, although a control type magnetic bearing is widely put into practical use, large electric power is required to the thrust bearings having very large axial force. Rotation loss occurs due to fluctuation of the magnetic field along the rotational direction. Additionally, there is limitation of manageable weight in a thrust bearing that utilizes superconducting bulk. There is a problem that a thrust bearing that utilizes superconducting bulk is not practicable to float and support a large-sized body.

The first object of the present invention is to propose a mechanism for floating and supporting a rotor and a movable body by utilizing superconductivity, which is effective in floating and supporting large-sized rotor and movable body.

The support mechanism that utilizes superconductivity is effective in floating and supporting a large-sized rotor or movable body as noted above. However, a permanent magnet may be utilized if there is no intention to support a large-sized rotor, etc. A non-contact thrust bearing that utilizes a permanent magnet may have a constitution that utilizes attraction of the permanent magnet to a ferromagnetic body. Two methods are considered as the example. That is, there is a method of generating thrust force to an extent that the ferromagnetic body is not completely attracted so as to mechanically support the rest of the load, or a method of using an additional control type magnetic bearing so as to support the load in a completely non-contact manner.

However, it is difficult to achieve a completely non-contact constitution in the former constitution. As a result, a substantial amount of the load has to be supported by mechanical contact. A completely non-contact constitution can be achieved by the latter constitution. However, use of an additional control type magnetic bearing is indispensable. Accordingly, the latter constitution is not desirable in view of costs and energy loss caused.

The second object of the present invention is to propose a mechanism for floating and supporting a rotor and a movable body by utilizing a permanent magnet, which is effective in floating and supporting relatively light rotor and movable body.

Means to Solve the Problems

A superconductivity utilizing support mechanism set forth in claim 1 which was made to achieve the first object above includes: a superconductive coil (1, 21, 31: For the sake of easy understanding toward the present invention, reference numbers used under the section name "BEST MODE FOR CARRYING OUT THE INVENTION" are given as required in this section. However, it should not be considered that the claims shall be limited by these reference numbers)) and a ferromagnetic body (2a, 22a, 32a). One of the ferromagnetic body (2a, 22a, 32a), so constituted as to slide in a direction of a center axis (1a, 21a, 31a) of the superconductive coil (1, 21, 31), and the superconductive coil (1, 21, 31), so constituted as to slide in a direction of the center axis (1a, 21a, 31a), is floated and supported relative to the other by axial magnetic attraction caused by a center plane (S1, S11) of the superconductive coil (1, 21, 31) and a center plane (S2, S13) of the ferromagnetic body (2a, 22a, 32a) moving apart from each other. It should be noted that the "center plane of coil" does not necessarily correspond to a geometric center of coil.

This superconductivity utilizing support mechanism can be applied to various objects. For example, if applied to a thrust bearing of a rotor, the thrust bearing will be as shown in claim 2. That is, the thrust bearing is provided with a rotor (2, 22) including the ferromagnetic body (2a, 22a). The rotor (2, 22) is so constituted as to rotate on the center axis (1a, 21a) of the superconductive coil (1, 21). The rotor (2, 22) is so constituted as to slide in a direction of the center axis (1a, 21a) of the superconductive coil (1, 21). The rotor (2, 22) is supported and floated by axial magnetic attraction caused by the center plane (S1) of the superconductive coil (1, 21) and the center plane (S2) of the ferromagnetic body (2a, 22a) moving apart from each other. Thereby, essentially stable and strong thrust bearing force is obtained to float and support the rotor (2, 22) in a direction of the center axis (1a, 21a) of the superconductive coil (1, 21).

If applied to the thrust bearing of such rotor, the superconductivity utilizing support mechanism may further adopt the following constitution. That is, the ferromagnetic body (22a) has a substantially ring shape or a substantially columnar shape, and is provided at its axially upper and lower ends with flange portions (221a) protruding radially outward. An annular member (26) is also provided which has a substantially U-shaped cross section and retains a cryogenic container (23) that accommodates the superconductive coil (21). The annular member (26) has an opening which faces radially inward, and is provided with convex portions (26a) which are located in vicinity of axially upper and lower ends of the superconductive coil (21) and are smaller in inner diameter than the superconductive coil (21). Moreover, the flange portions (221a) formed at the axially upper and lower ends of the ferromagnetic body (22a) are arranged to face the convex portions (26a) of the annular member (26).

The convex portions (26a) of the annular member (26) function as a magnetic path of magnetic force generated by the superconductive coil (21). The convex portions (26a) of the annular member (26) are arranged to face the flange portions (221a) formed at the axially upper and lower ends of the ferromagnetic body (22a). Accordingly, if the convex portions (26a) of the annular member (26) and the flange portions (221a) of the ferromagnetic body (22a) are in positions to face each other, the center plane (S1) of the superconductive coil (21) and the center plane (S2) of the ferromagnetic body (22a) coincide with each other. In this case, axial magnetic attraction does not work. However, if the center plane (S1) of the superconductive coil (21) and the center plane (S2) of the ferromagnetic body (22a) are axially shifted relative to each other from the facing position, the center plane (S1) of the superconductive coil (21) and the center plane (S2) of the ferromagnetic body (22a) are separated. Therefore, axial magnetic attraction works.

Also, if applied to a movable body support mechanism of linear move type, the movable body support mechanism will be as shown in claim 3. That is, the movable body support mechanism is provided with: a movable body (33) including the superconductive coil (31), and a track (32) including the ferromagnetic body (32a). The movable body (33) is so constituted as to move along the track (32). The movable body (33) is also constituted to slide in a direction of the center axis (31a) of the superconductive coil (31). The movable body (33) is floated and supported by axial magnetic attraction caused by the center plane (S11) of the superconductive coil (31) and the center plane (S13) of the ferromagnetic body (32a) moving apart from each other. Thereby, essentially stable and strong thrust bearing force is obtained to float and support the movable body (33) in a direction of the center axis (31a) of the superconductive coil (31).

In the case of combination of a permanent magnet and superconducting bulk proposed in the aforementioned prior art, it is difficult to raise precision in shape, etc. of both the permanent magnet and the superconducting bulk. There is a problem in stable support. On the other hand, a superconductive coil is utilized in the superconductivity utilizing support mechanism of the present invention. In the case of this superconductive coil, precision in shape can be easily raised. It is advantageous in stable float and support. Also, the rotor or the movable body to be supported may only include a ferromagnetic body made of steel or the like, for example. It is also advantageous in that no special kind of material is required.

Here, the reason will be given why there has been no concept like the present invention before. In the technical trend regarding a bearing that utilizes superconductivity, there is a predominant premise of combination of a permanent magnet and superconducting bulk. On the premise of the combination, research and development are stimulated with such intention as to remove the above restrictions by performance upgrade of material. Ideally, this combination is a proper constitution which provides support in both floating direction and horizontal direction. However, in reality, it is difficult to raise precision in shape, etc. of both the permanent magnet and the superconducting bulk. There is a problem in stable support. The inventor of the present application has focused such problem and noted that, in the case of a superconductive coil, a strong magnetic field can be easily generated and precision in shape can be easily raised. If a ferromagnetic body is arranged within such a range that the magnetic attraction may become stronger as the ferromagnetic body goes farther in a direction of a center axis of the superconductive coil from a center plane of the superconductive coil, the center plane of the coil is assumed as a stabilization point and a stable spring characteristic is obtained. The inventor has found that the above fact is usable and invented the aforementioned invention. Thereby, a support mechanism for heavy load can be implemented which has never been imagined before.

Specifically, if a support object is a rotor as in the superconductivity utilizing support mechanism set forth in claim 2, circular magnetic field distribution having extremely less distortion can be easily obtained by utilization of a superconductive coil. Accordingly, even from such viewpoint, there is a large advantage over the combination of a permanent magnet and bulk. Use of a circular superconductive coil also provides such an advantage that no eddy current loss or hysteresis loss may occur, in principle, even if a rotor having a ferromagnetic body is rotated while non-contact thrust force is maintained.

A permanent magnet utilizing support mechanism set forth in claim 4 which was made to achieve the second object above includes an axially magnetized ring permanent magnet (51), and a ferromagnetic body (52a). One of the ferromagnetic body (52a), so constituted as to slide in a direction of a center axis of the ring permanent magnet (51), and the ring permanent magnet (51), so constituted as to slide in a direction of the center axis of the ring permanent magnet (51), is floated and supported relative to the other by axial magnetic attraction caused by a center plane of the ring permanent magnet (51) and a center plane of the ferromagnetic body (52a) moving apart from each other.

This permanent magnet utilizing support mechanism can be applied to various objects. For example, if applied to a thrust bearing of a rotor, the thrust bearing will be as shown in claim 5. That is, the thrust bearing is provided with a rotor (52) including the ferromagnetic body (52a). The rotor (52) is so constituted as to rotate on the center axis of the ring permanent magnet (51). Also, the rotor (52) is so constituted as to slide in a direction of the center axis of the ring permanent magnet (51). The rotor (52) is floated and supported by axial magnetic attraction caused by a center plane of the ring permanent magnet (51) and a center plane of the ferromagnetic body (52a) moving apart from each other. Thereby, essentially stable and strong thrust bearing force is obtained to float and support the rotor (52) in a direction of the center axis of the ring permanent magnet (51).

If applied to the thrust bearing of such rotor, the following constitution may be adopted. That is, the ferromagnetic body (52a) has a substantially ring shape or a substantially columnar shape, and is provided at its axially upper and lower ends with flange portions protruding radially outward. A ferromagnetic body ring (56) having a smaller diameter than the ring permanent magnet (51) is fixed to the axially upper and lower ends of the ring permanent magnet (51) in a concentric fashion. Moreover, the flange portions formed at the axially upper and lower ends of the ferromagnetic body (52a) are arranged to face the ferromagnetic body ring (56) fixed to the axially upper and lower ends of the ring permanent magnet (51).

The ferromagnetic body ring (56) fixed to the axially upper and lower ends of the ring permanent magnet (51) functions as a magnetic path of magnetic force generated by the permanent magnet (51). The ferromagnetic body ring (56) is arranged to face the flange portions provided at the axially upper and lower ends of the ferromagnetic body (52a). Accordingly, if the ferromagnetic body ring (56) and the flange portions of the ferromagnetic body (52a) are in positions to face each other, the center plane of the ring permanent magnet (51) and the center plane of the ferromagnetic body (52a) coincide with each other. In this case, axial magnetic attraction does not work. However, if the center plane of the ring permanent magnet (51) and the center plane of the ferromagnetic body (52a) are axially shifted relative to each other from the facing position, the center plane of the ring permanent magnet (51) and the center plane of the ferromagnetic body (52a) are separated. In this case, axial magnetic attraction works.

EXPLANATION OF REFERENCE NUMERALS

1 ... superconductive coil, 1a ... coil center axis, 2 ... rotor, 2a ... ferromagnetic body, 2b ... rotation shaft, 3 ... cryogenic container, 5 ... control type magnetic bearing, 7 ... casing, 21 ... superconductive coil, 21a ... center axis of coil, 22 ... rotor, 22a ... ferromagnetic body, 221a ... flange portion, 22b ... rotation shaft, 23 ... cryogenic container, 25 ... control type magnetic bearing, 26 ... annular member, 26a ... convex portion, 27 ... casing, 31 ... superconductive coil, 31a ... coil center axis, 32 ... track, 32a ... ferromagnetic body, 33 ... movable body, 33a ... axis in a direction of travel, S1, S11 ... coil center plane, S12 ... guide plane, S2, 513 ... ferromagnetic body center plane, 51 ... permanent magnet, 52 ... rotor, 52a ... attracted steel, 52b ... rotation shaft, 55 ... mechanical bearing, 56, steel ring, 57 ... casing, 65 ... control type magnetic bearing.

BEST MODE FOR CARRYING OUT THE INVENTION

Embodiments of the present invention will be explained hereafter, by way of the drawings.

First Embodiment

Figure 1:
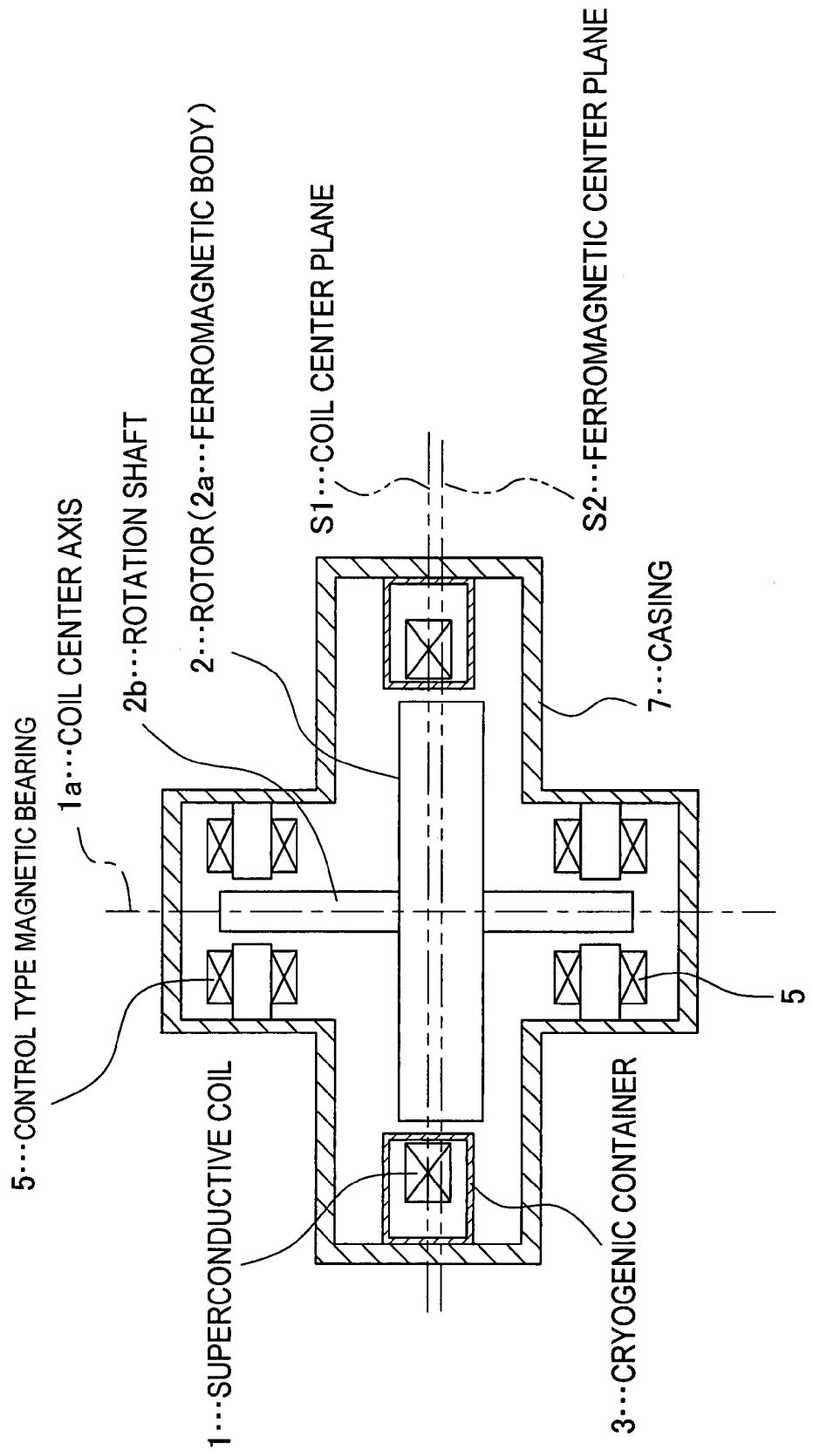
FIG. 1 is a schematic end view of a superconductivity utilizing support mechanism according to a first embodiment.

FIG. 1 is a schematic end view of a superconductivity utilizing support mechanism according to a first embodiment.

As shown in FIG. 1, the superconductivity utilizing support mechanism is provided with a superconductive coil 1, a rotor 2 including a ferromagnetic body 2a made of steel or the like, a cryogenic container 3 that accommodates the superconductive coil 1, a control bearing 5, and a casing 7 that accommodates the superconductive coil 1, the rotor 2, the cryogenic container 3, and the control type magnetic bearing 5.

The rotor 2 is rotatably supported on a center axis (coil center axis) 1a of the superconductive coil 1. The rotor 2 is so constituted as to slide in a direction of the coil center axis 1a. Particularly, a rotation shaft 2b of the rotor 2 is provided to penetrate the center of the disk-shaped ferromagnetic body 2a. The rotor 2 is so constituted as to provide non-contact support (for the rotation shaft 2b) at both an upper end and a lower end of the rotation shaft 2b by the control type magnetic bearing 5 utilizing an electromagnet or the like. Thereby, the rotor 2 is rotatably supported on the coil center axis 1a and is able to slide in a direction of the coil center axis 1a. Not such magnetically controlled bearing as above but an air bearing can also achieve a non-contact bearing. Also, if not particular about being non-contact, a mechanical bearing utilizing a bearing or the like may be used.

The superconductive coil 1 is formed into a regular annular shape. The superconductive coil 1 is arranged to enclose the ferromagnetic body 2a of the rotor 2. Particularly, the cryogenic container 3 is fixed on an inner peripheral surface of the casing 7. The superconductive coil 1 is arranged inside the cryogenic container 3. The ferromagnetic body 2a of the rotor 2 is then arranged to be enclosed by the annular superconductive coil 1. More specifically, the ferromagnetic body 2a of the rotor 2 is arranged within such a predetermined range that magnetic attraction may become stronger as a center plane (ferromagnetic body center plane) S2 of the ferromagnetic body 2a and a center plane (coil center plane) S1 of the superconductive coil 1 are separated away in a direction of the coil center axis 1a, so that the rotor 2 is supported in a direction of the rotation shaft 2b (of the rotor 2). Generally, the coil center plane S1 does not necessarily coincide with a geometric center of the superconductive coil 1. However, in the present embodiment, the geometric center coincides with the coil center plane S1 since the superconductive coil 1 is symmetrically formed. Also, the coil center axis 1a extends in a direction of a normal line of the coil center plane S1. The ferromagnetic body 2a of the present embodiment is formed into a symmetric disk shape. Thus, a geometric center plane of the disk-shaped ferromagnetic body 2a is referred as the ferromagnetic body center plane S2.

Here, explanation is given on the meaning of "the ferromagnetic body 2a of the rotor 2 is arranged within such a predetermined range that magnetic attraction may become stronger as the ferromagnetic body center plane S2 and the coil center plane S1 are separated away in a direction of the coil center axis 1a". In case that the ferromagnetic body 2a is arranged in a magnetic field formed by the superconductive coil 1, magnetic attraction that pulls back the ferromagnetic body 2a is cancelled and no axial force is generated, if the ferromagnetic body center plane S2 and the coil center plane S1 coincide with each other. On the other hand, as shown in FIG. 1, if the ferromagnetic body center plane S2 and the coil center plane S1 do not coincide with each other, magnetic attraction is generated which pulls back the ferromagnetic body 2a toward such a direction that the ferromagnetic body center plane S2 and the coil center plane S1 may coincide with each other. Force (spring force) that would return the ferromagnetic body 2a to the center plane S1 of the superconductive coil 1 is generated. It can be said that "magnetic attraction becomes stronger as the ferromagnetic body center plane S2 and the coil center plane S1 are separated away in a direction of the coil center axis 1a (that is, as the ferromagnetic body center plane S2 is drawing away from the coil center plane S1 in a direction of the coil center axis 1a)" if a distance between the ferromagnetic body center plane S2 and the coil center plane S1 is within the predetermined range. However, outside the predetermined range, "magnetic attraction becomes weaker as the ferromagnetic body center plane S2 is drawing away from the coil center plane S1 in a direction of the coil center axis 1a". Accordingly, in the present embodiment, the ferromagnetic body 2a is arranged within such a predetermined range that "magnetic attraction may become stronger as the ferromagnetic body center plane S2 and the coil center plane S1 are separated away in a direction of the coil center axis 1a" as in the former description.

Such arrangement offers an essentially stable and strong bearing force in floating and supporting the rotor 2 in a direction of the coil center axis 1a. Also, such arrangement provides advantages as below in comparison to the combination of a permanent magnet and superconductive bulk proposed in prior art.

(1) In the case of the conventional constitution, it is difficult to raise precision of the shape, etc. of both the permanent magnet and the superconducting bulk. There is a problem in stable support. In contrast, the superconductivity utilizing support mechanism according to the present embodiment utilizes the superconductive coil 1. It is easy to raise precision in shape in the case of the superconductive coil 1. It is advantageous in stable float and support.

(2) In the case of the support mechanism utilizing superconductive bulk, there is limitation in manageable weight. Such support mechanism is not realistic to be used for a large-sized support object. On the other hand, the present embodiment utilizes the superconductive coil 1. It is comparatively easy to generate a strong magnetic field in the case of the superconductive coil 1. Also, it is comparatively easy to obtain the large-sized the superconductive coil 1. Accordingly, it is easy to relatively increase manageable weight. As such, without use of the superconductive coil 1, the coil capable of generating a necessary magnetic field may become very large when weight of a support object is increased, or, depending on the weight of the support object, generation of a necessary magnetic field is virtually impossible. In that sense, use of the superconductive coil 1 is very effective.

(3) It is only necessary for the rotor 2 as the support object to include the ferromagnetic body 2a made of steel or the like. It is also advantageous in that no specific material is necessitated.

(4) Use of the superconductive coil 1 allows to easily obtain circular magnetic field distribution having extremely less distortion. Accordingly, from such viewpoint, there is a large advantage over the combination of a permanent magnet and superconductive bulk as in the conventional constitution. Use of the circular superconductive coil 1 also provides such an advantage that no eddy current loss or hysterisis loss may occur in principle, even if the rotor 2 having the ferromagnetic body 2a is rotated while non-contact thrust force is maintained. That is, as far as the rotation shaft 2b of the rotor 2 coincides with the coil center axis 1a, there is no change in magnetic field in respective portion of the ferromagnetic body 2a even if the rotor 2 is rotated. Thus, rotational resistance due to magnetic factors never occurs.

Variation of First Embodiment

Figure 2:
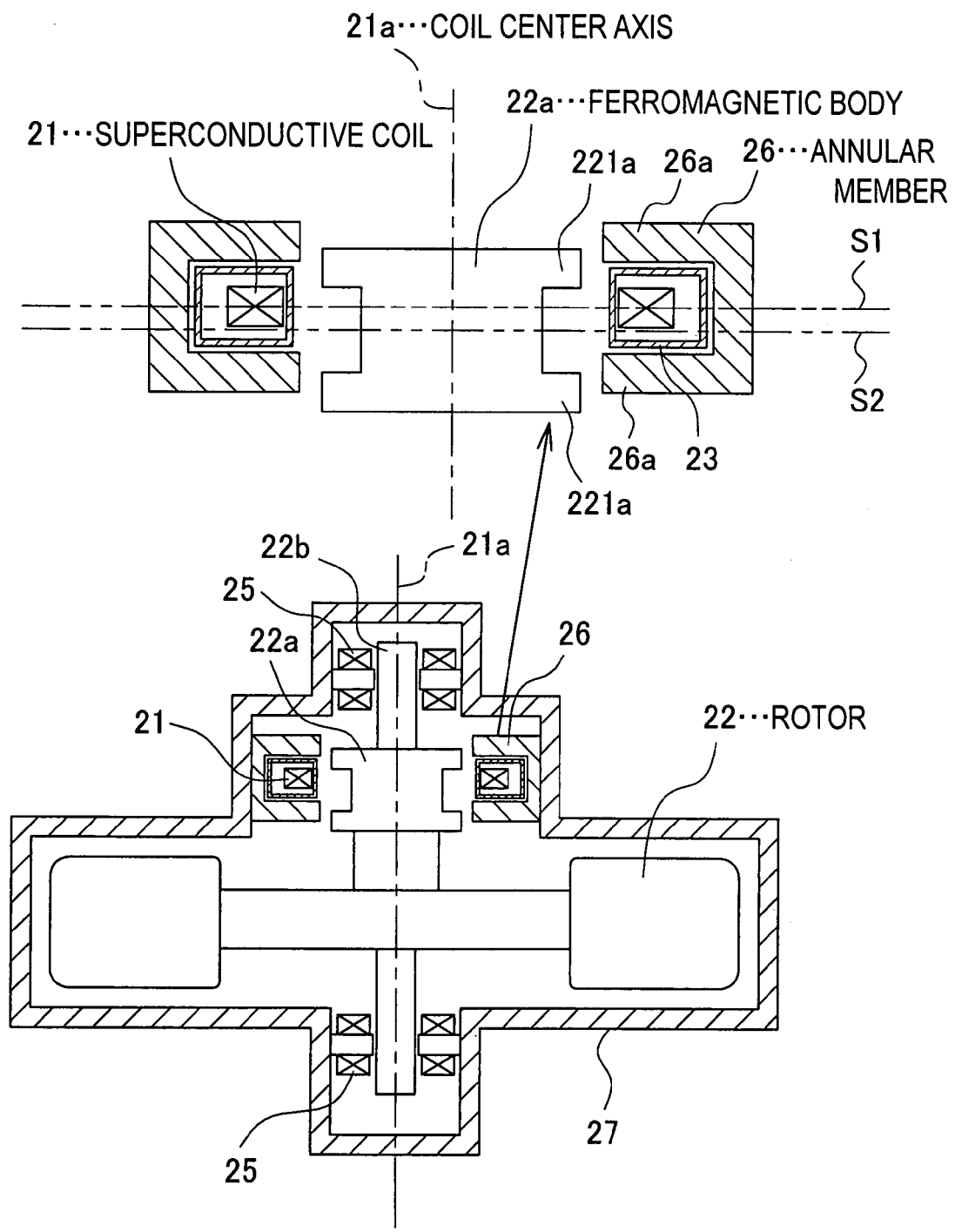
FIG. 2 is a schematic end view of the superconductivity utilizing support mechanism in variation of the first embodiment.

FIG. 2 is a schematic end view of the superconductivity utilizing support mechanism in variation of the first embodiment.

As in the embodiment shown in FIG. 1, the superconductive coil 1 is arranged to enclose the portion where the diameter of the rotor 2 is the largest, that is, the outer periphery of the disk-shaped ferromagnetic body 2a. However, in the case of large machinery, the constitution shown in FIG. 2 is also effective.

The superconductivity utilizing support mechanism shown in FIG. 2 is provided with a superconductive coil 21, a rotor 22 including a ferromagnetic body 22a made of steel or the like, a cryogenic container 23 that accommodates the superconductive coil 21, a control type magnetic bearing 25, and a casing 27 that accommodates the superconductive coil 21, the rotor 22, the cryogenic container 23, and the control type magnetic bearing 25.

The rotor 22 in the present variation is a flywheel. A rotation shaft 22b is provided to penetrate the center of the rotor 22. The ferromagnetic body 22a is attached to the rotation shaft 22b in a fashion concentric to the rotor 22. In comparison between the outer diameter of the ferromagnetic body 22a and the outer diameter of the rotor 22, the outer diameter of the rotor 22 is substantially larger than the outer diameter of the ferromagnetic body 22a. That is, the purpose of this constitution is to rotate the large-sized rotor 22. However, the rotor 22 is supported in a thrust direction by the ferromagnetic body 22a. Accordingly, the regular annular superconductive coil 21 is arranged to enclose the ferromagnetic body 22a. Particularly, an annular member 26 having a substantially U-shaped cross section is fixed to the inner peripheral surface of the casing 27. The cryogenic container 23 is retained by the annular member 26. The superconductive coil 21 is disposed within the cryogenic container 23.

The ferromagnetic body 22a has a substantially columnar shape, but with flange portions 221a formed at its upper and lower ends. Thus, the ferromagnetic body 22a has a vertically symmetric shape. The flange portions 221a are formed at such positions as to be able to face convex portions 26a formed on upper and lower portions of the aforementioned annular member 26 having a substantially U-shaped cross section. The annular member 26 includes a ferromagnetic body and has a vertically symmetric shape. The convex portions 26a function as a magnetic path of a magnetic force generated by the superconductive coil 21 disposed within the cryogenic container 23 retained by the annular member 26. Accordingly, if the flange portions 221a of the ferromagnetic body 22a are in positions to face the convex portions 26a of the annular member 26, the center plane S1 of the superconductive coil 21 and the center plane S2 of the ferromagnetic body 22a coincide with each other. Axial magnetic attraction does not work. However, if the center plane S1 of the superconductive coil 21 and the center plane S2 of the ferromagnetic body 22a are separated, axial magnetic attraction works.

In the superconductivity utilizing support mechanism having the above constitution, the same effects can be obtained as those in the superconductivity utilizing support mechanism shown in FIG. 1. The constitution is effective in floating and supporting the rotor 22 which is the large-sized flywheel as noted above. That is, for example, if the rotor 22 has to include a ferromagnetic body and the superconductive coil 21 has to be arranged to enclose the outer periphery of the rotor 22, the size of the superconductive coil 21 also has to be large. However, there may be cases in which such large sized superconductive coil 21 is not necessary upon exertion of magnetic attraction for supporting the rotor 22. Accordingly, to cope with such cases, the ferromagnetic body 22a having a smaller outer diameter than the rotor 22 may be separately prepared. Then, bearing force in a thrust direction may be obtained by magnetic attraction between the ferromagnetic body 22a and the superconductive coil 21, as noted above. In this manner, the superconductive coil 21 is inhibited from becoming unnecessarily large.

Second Embodiment

Figure 3A:
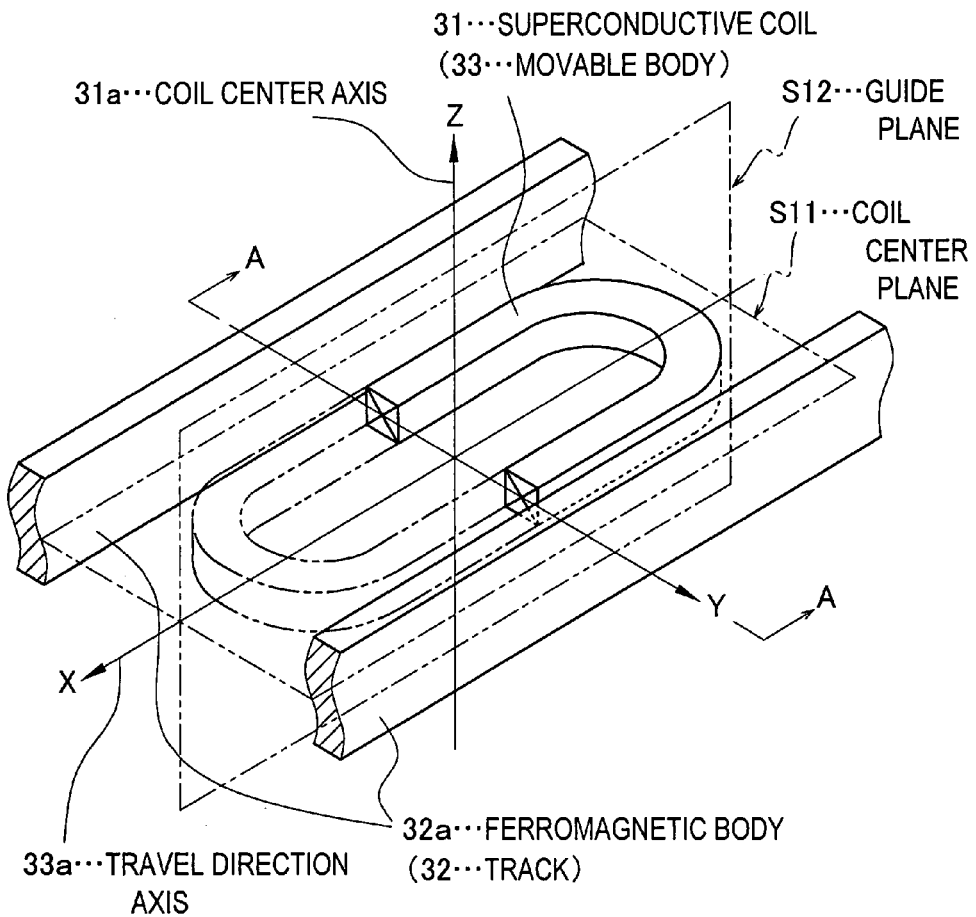
FIG. 3 (a) is a schematic perspective view of a superconductivity utilizing support mechanism according to a second embodiment, and (b) is an end view taken from a section A-A of (a).
Figure 3B:
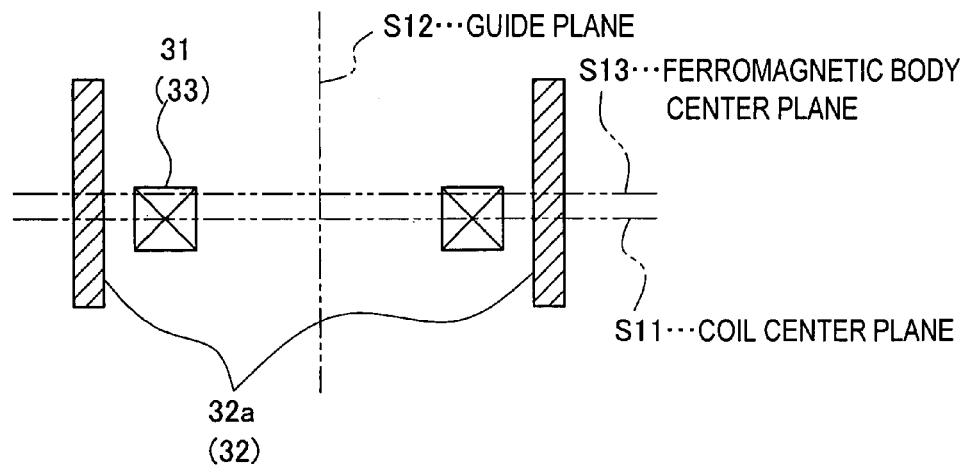

FIG. 3(a) is a schematic perspective view of a superconductivity utilizing support mechanism according to a second embodiment. FIG. 3(b) is an end view taken from a section A-A of FIG. 3(a).

In the aforementioned first embodiment, particular examples of the present invention have been described which is implemented as a support mechanism of a rotor. In the second embodiment, a particular example will be described in which the present invention is implemented as a support mechanism of a movable body.

As shown in FIG. 3, the superconductivity utilizing support mechanism is provided with a movable body 33 including a superconductive coil 31, and a track 32 including a ferromagnetic body 32a. FIG. 3 only shows the superconductive coil 31 section. However, the movable body 33 is also provided with not shown components, in addition to the superconductive coil 31. Since it is sufficient to show the superconductive coil 31 section for explanation on a support mechanism section, FIG. 3 does not show all of the movable body 33. The track 32 is composed from two ferromagnetic bodies 32a in the form of rectangular plates which are so arranged in parallel that planes of the ferromagnetic bodies 32a are faced to each other. The ferromagnetic bodies 32a in this case may be made of steel which thus constitute two steel rails.

The movable body 33 is guided along a plane (guide plane) S12 which includes a center axis (coil center axis) 31a of the superconductive coil 31 and an axis 33a in a direction of travel of the movable body 33. The movable body 33 is also constituted to slide in a direction of the coil center axis 31a. Detail is not shown as to the constitution of being guided along the guide plane S12 and slid in a direction of the coil center axis 31a. However, the schematic constitution is shown below. That is, the movable body 33 has a guide wheel at its lower end, for example. A rotation direction of the guide wheel is directed only to a direction of travel of the movable body 33. Originally, there is no vertical restraint force in such guide wheel. Therefore, if the guide wheel is rotated and is on the move toward the direction of travel, the movable body 33 can relatively easily slide in a vertical direction. Thereby, the movable body 33 is guided along the guide face S12, and is able to slide in a direction of the coil center axis 31a.

The superconductive coil 31 is constituted like a race track, and disposed between the two ferromagnetic bodies 32a (steel rails) in the form of rectangular plates of the track 32. Particularly, the superconductive coil 31 is disposed within a not shown cryogenic container, and the superconductive coil 31 is placed between the ferromagnetic bodies 32a. More specifically, the superconductive coil 31 of the movable body 33 is arranged in such a predetermined range that magnetic attraction may become stronger as a center plane (ferromagnetic body center plane) S13 of the ferromagnetic bodies 32a and a center plane (coil center plane) S11 of the superconductive coil 31 are separated away in a direction of the coil center axis 31a. Thereby, the movable body 33 is supported in a direction of the coil center axis 31a. As in the case of the aforementioned first embodiment, the coil center plane S31 does not necessarily coincide with a geometric center of the superconductive coil 31 in general. However, in the present embodiment, the geometric center and the coil center plane S11 coincide with each other since the superconductive coil 31 is symmetrically formed. Also, the coil center axis 31a extends in a direction of a normal line of the coil center plane S11. In the ferromagnetic bodies 32a of the present embodiment, two members having an identical shape are symmetrically disposed. Thus, as shown in FIG. 3(b), a geometric center plane of the two ferromagnetic bodies 32a in the form of rectangular plates is referred as the ferromagnetic body center plane S13.

Here, the meaning of "the superconductive coil 31 of the movable body 33 is arranged in such a predetermined range that magnetic attraction may become stronger as the ferromagnetic body center plane S13 and the coil center plane S11 are separated away in a direction of the coil center axis 31a" is the same as in the case of the aforementioned first embodiment. That is, as shown in FIG. 3(b), if the ferromagnetic body center plane S13 does not coincide with the coil center plane S11, magnetic attraction is generated which pulls back the ferromagnetic bodies 32a toward such a direction that the ferromagnetic, body center plane S13 and the coil center plane S11 may coincide with each other. However, it can be said that "magnetic attraction becomes stronger as the ferromagnetic body center plane S13 and the coil center plane S11 are separated away in a direction of the coil center axis 31a (that is, as the ferromagnetic body center plane S13 is drawing away from the coil center plane S11 in a direction of the coil center axis 31a)" if a distance between the ferromagnetic body center plane S13 and the coil center plane S11 is in a predetermined range. However, outside the predetermined range, "magnetic attraction becomes weaker as the ferromagnetic body center plane S13 is drawing away from the coil center plane S11 in a direction of the coil center axis 31a". Accordingly, in the present embodiment, the superconductive coil 31 of the movable body 33 is arranged within such a predetermined range that "magnetic attraction may become stronger as the ferromagnetic body center plane S13 and the coil center plane S11 are separated away in a direction of the coil center axis 31a" as in the former description.

Such arrangement offers an essentially stable and strong bearing force in floating and supporting the movable body 33 in a direction of the coil center axis 31a.

Also, such arrangement provides the same advantages as below as in the case of the aforementioned first embodiment.

(1) In the case of the conventional constitution, it is difficult to raise precision of the shape, etc. of both the permanent magnet and the superconducting bulk. There is a problem in stable support. In contrast, the superconductivity utilizing support mechanism according to the present embodiment utilizes the superconductive coil 31. In the case of the superconductive coil 31, it is easy to raise precision in shape. It is advantageous in stable float and support.

(2) In the case of the support mechanism utilizing superconductive bulk, there is limitation in manageable weight. Such support mechanism is not realistic for use with a large-sized support object. On the other hand, the present embodiment utilizes the superconductive coil 31. In the case of the superconductive coil 31, it is comparatively easy to generate a strong magnetic field. It is also comparatively easy to obtain the large-sized the superconductive coil 31. Accordingly, it is easy to relatively increase manageable weight. As such, without use of the superconductive coil 31, the coil capable of generating a necessary magnetic field may become very large when weight of a support object is increased, or, depending on the weight of the support object, generation of a necessary magnetic field is virtually impossible. In that sense, use of the superconductive coil 31 is very effective.

As noted above, the present embodiment is suitable for such cases that a support object is large-sized and heavy weighted. Thus, it is very advantageous if the movable body 33 is assumed as a linear motor vehicle, for example.

(3) Also, it is only necessary for the track 32 to include the ferromagnetic bodies 32a made of steel or the like. It is also advantageous in that no specific material is necessitated.

Third Embodiment

Figure 4A:
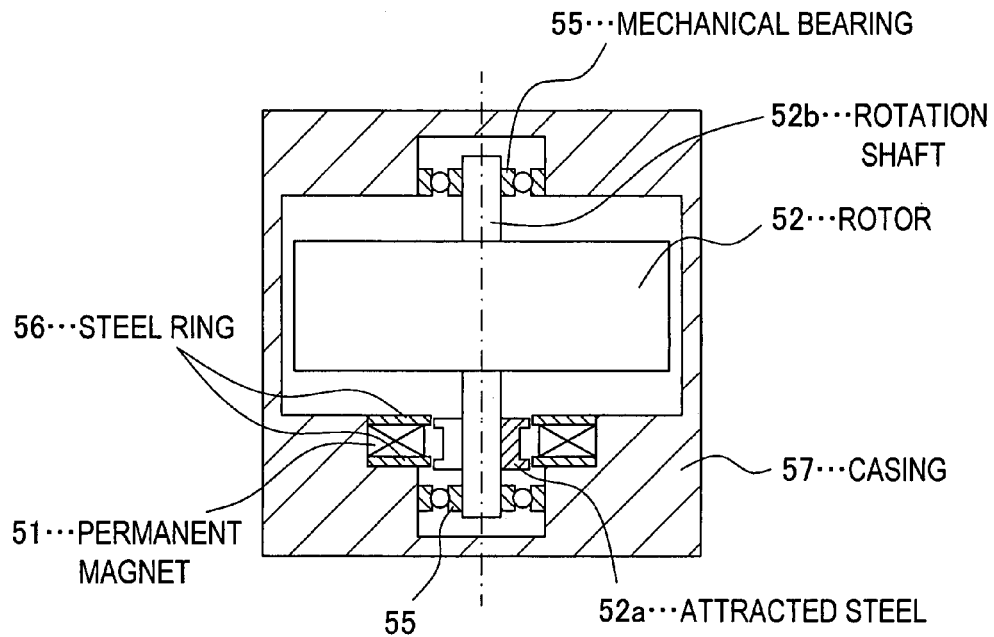
FIG. 4 is a schematic end view of a permanent magnet utilizing support mechanism according to a third embodiment.

FIG. 4(a) is a schematic end view of a permanent magnet utilizing support mechanism according to a third embodiment.

As shown in FIG. 4(a), the permanent magnet utilizing support mechanism is provided with a ring permanent magnet 51, steel rings 56 as "ferromagnetic body rings" provided above and below the permanent magnet 51, a rotor 52 including an attracted steel 52a as a "ferromagnetic body", a mechanical bearing 55, and a casing 57 that accommodates the permanent magnet 51, the steel rings 56, the rotor 52, and the mechanical bearing 55. The steel rings 56 and the attracted steel 52a may be formed as ferromagnetic bodies made of other than steel.

The rotor 52 is a columnar flywheel. A rotation shaft 52b is provided to penetrate the center of the rotor 52. The mechanical bearing 55 that utilizes a bearing supports the rotation shaft 52b both at an upper end and a lower end of the rotation shaft 52b. Thereby, the rotor 52 is rotatably supported on the coil center axis 1a.

Figure 4B:
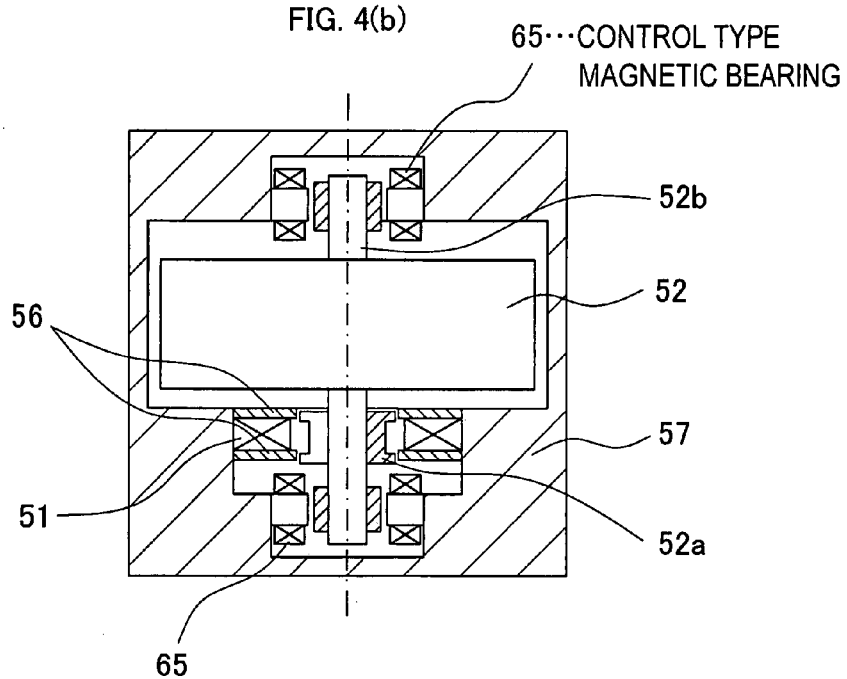
Figure 5A:
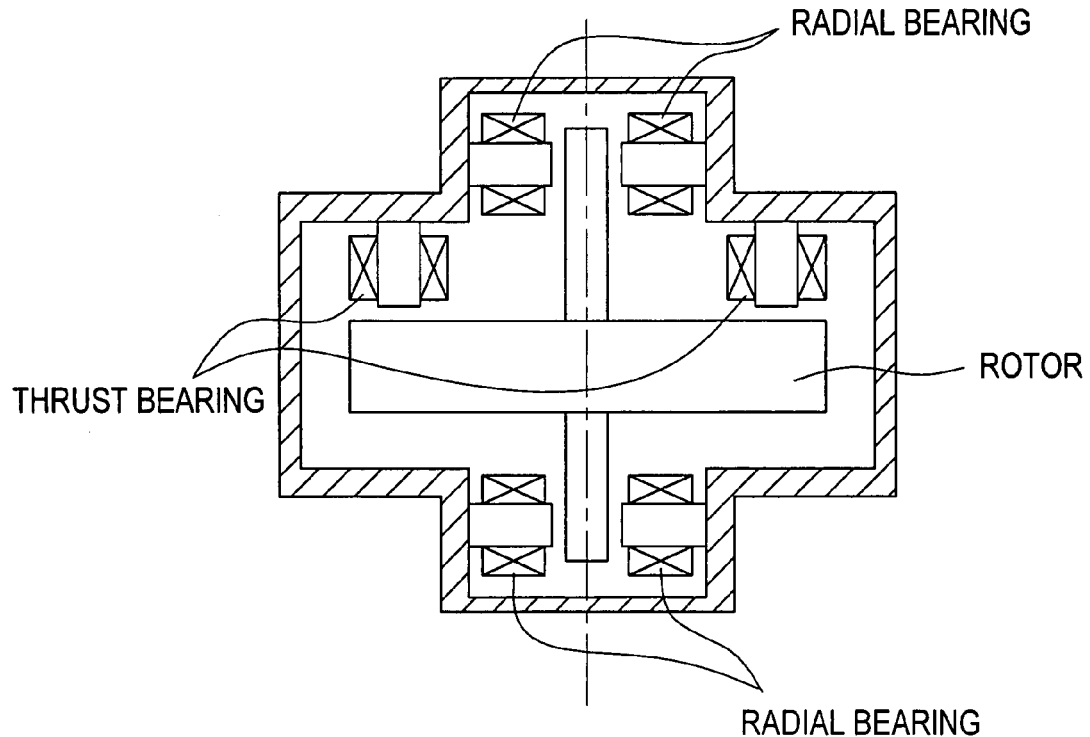
FIG. 5 is an explanatory view of prior art.
Figure 5B:
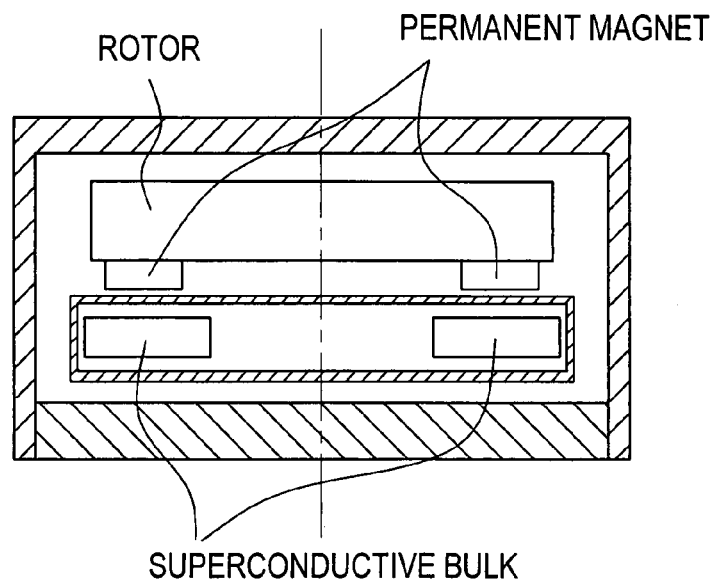
Figure 6A:
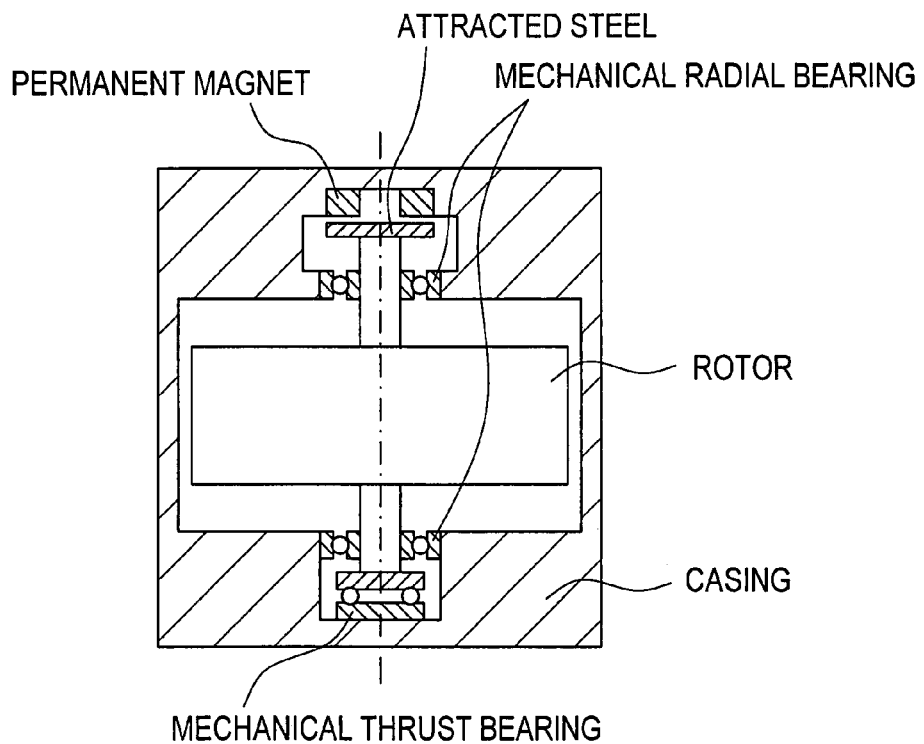
FIG. 6 is an explanatory view of prior art.
Figure 6B:
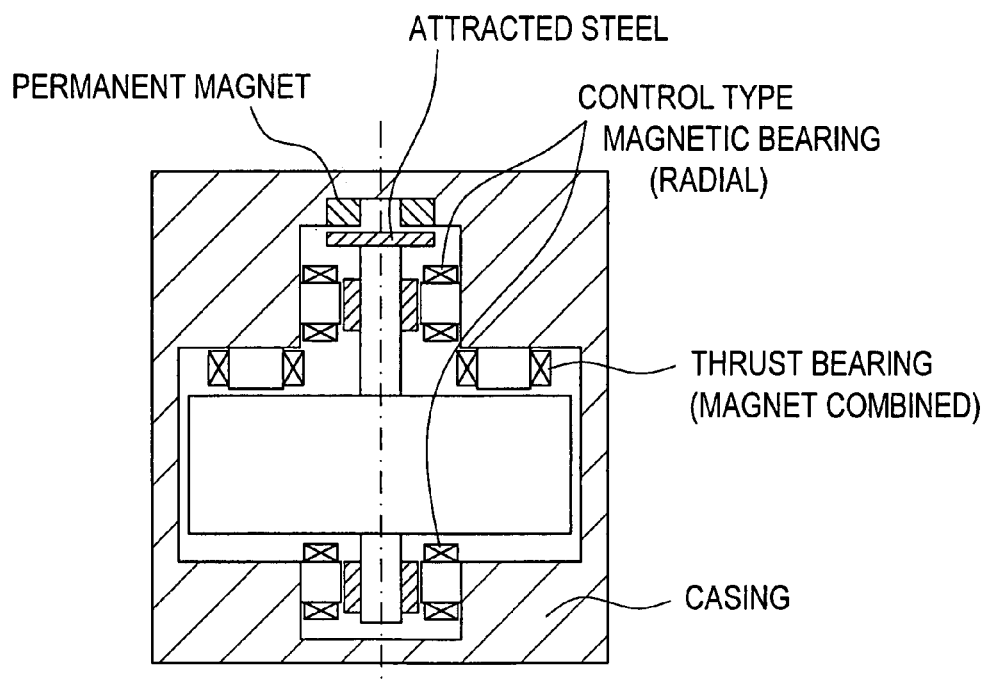

Not the mechanical bearing 55 as such but a control type magnetic bearing 65 utilizing an electromagnet or the like may be also adopted as shown in FIG. 4(b). Use of the control type magnetic bearing 65 utilizing an electromagnet or the like can also provide non-contact support for the rotation shaft 52b of the rotor 52. Also, even an air bearing can achieve a non-contact bearing.

The attracted steel 52a is attached to the rotation shaft 52b in a fashion concentric to the rotor 52. In comparison between the outer diameter of the attracted steel 52a and the outer diameter of the rotor 52, the outer diameter of the rotor 52 is substantially larger than the outer diameter of the attracted steel 52a. The attracted steel 52a has a substantially ring shape. However, flange portions protruding toward a radial direction is formed at axially upper and lower ends of the attracted steel 52a. The attracted steel 52a are formed into a vertically symmetric shape (if the axial direction is assumed as a vertical direction).

The ring permanent magnet 51 is formed into a regular annular shape and axially magnetized. The steel rings 56 having a smaller inner diameter than the ring permanent magnet 51 are fixed to the axially upper and lower ends of the ring permanent magnet 51 in a concentric fashion. Thereby, as is also clear from FIG. 4(a), if the ring permanent magnet 51 and the steel ring 56 are assumed as a unit, there exist flange portions (steel rings 56 in fact) protruding toward a radial direction at axially upper and lower ends of the unit. The unit is also formed into a vertically symmetric shape (if the axial direction is assumed as a vertical direction).

The steel rings 56 corresponding to flange portions protruding radially inward if the permanent magnet 51 and the steel rings 56 are assumed as a unit and the flange portions protruding radially outward of the aforementioned attracted steel 52a are disposed in positions to face each other.

The steel rings 56 function as a magnetic path of magnetic force generated by the permanent magnet 51. The steel rings 56 are arranged to face the flange portions of the attracted steel 52a. Thus, when the steel rings 56 and the flange portions of the attracted steel 52a are in positions to face each other, the center plane of the ring permanent magnet 51 and the center plane of the attracted steel 52a coincide with each other. In this case, axial magnetic attraction does not work. However, when the steel rings 56 and the flange portions of the attracted steel 52a are relatively shifted from the facing position in the axial direction, the center plane of the ring permanent magnet 51 and the center plane of the attracted steel 52a are separated. In this case, axial magnetic attraction works.

The attracted steel 52a of the present embodiment is formed into a vertically symmetric substantially ring shape (if the axial direction is assumed as a vertical direction). Thus, the geometric center plane of the attracted steel 52a corresponds to a "center plane of the ferromagnetic body" in claims. Also, if the permanent magnet 51 and the steel ring 56 are assumed as a unit, the unit is also formed into a vertically symmetric shape (if the axial direction is assumed as a vertical direction). Thus, the geometric center plane of the permanent magnet 51 corresponds to a "center plane of the permanent magnet ring" in claims.

Such constitution allows to obtain essentially stable bearing force when the rotor 52 is floated and supported in a direction of the center axis 52b. In the third embodiment, the permanent magnet 51, and not the superconductive coil 1, 21, 31 as in the first and the second embodiments, is utilized. Thus, it is possible to obtain bearing force in a thrust direction by means of an inexpensive and extremely easy constitution.

Use of the superconductive coil 1, 21, 31 as in the first and the second embodiments is suitable for supporting a relatively heavy support object. However, use of the permanent magnet 51 as in the third embodiment is very effective if applied to a relatively light support object.

The mechanical bearing 55 in FIG. 4(a) and the control type magnetic bearing 65 in FIG. 4(b) are proposed as a radial bearing. Adoption of the mechanical bearing 55 as in FIG. 4(a) simplifies the constitution of a support mechanism. On the other hand, adoption of the control type magnetic bearing 65 as in FIG. 4(b) can achieve a completely non-contact support mechanism with little damage as a flywheel.

[Others]

The embodiments of the present invention are described in the above. However, the present invention can take various modes.

For instance, the present invention can be implemented as a support mechanism of a propulsion shaft of a large-sized ship, as an example of application of the superconductivity utilizing support mechanism of the present invention. The propulsion shaft of a large-sized ship transmits rotational power. At the same time, large thrust force is applied to the propulsion shaft by screw rotation. Thus, if such large thrust force can be supported in a non-contact manner by utilizing the constitution as in the first embodiment, excellent equipment would be provided without care for wear.

In the third embodiment, a particular example is described in which the present invention is implemented as a support mechanism of a rotor. However, in the case of such support mechanism utilizing a permanent magnet as well, the present invention can be applied in the same manner to a support object, aside from a rotor, which is necessary to be axially supported in a non-contact manner.

The invention claimed is:

1. A superconductivity utilizing support mechanism comprising:
   a superconductive coil;
   a ferromagnetic body; and
   an annular member that has a substantially U-shaped cross-section,
   the superconductive coil being arranged inside a U-shaped portion of the annular member,
   wherein the ferromagnetic body has a substantially ring shape or a substantially columnar shape, and is provided at its axially upper and lower ends and also at a position facing convex portions of the U-shaped portion of the annular member, with flange portions protruding radially outward, and
   one of the ferromagnetic body, so constituted as to slide in a direction of a center axis of the superconductive coil, and the superconductive coil, so constituted as to slide in a direction of the center axis thereof, being floated and supported relative to the other by axial magnetic attraction caused by a center plane of the superconductive coil and a center plane of the ferromagnetic body moving apart from each other.

2. The superconductivity utilizing support mechanism according to claim 1 further comprising:
a rotor that includes the ferromagnetic body,
the rotor being so constituted as to rotate on the center axis of the superconductive coil and to slide in a direction of the center axis of the superconductive coil,
wherein the rotor is floated and supported relative to the other by the axial magnetic attraction caused by the center plane of the superconductive coil and the center plane of the ferromagnetic body moving apart from each other.

3. The superconductivity utilizing support mechanism set forth in claim 1 further comprising:
a movable body that includes the superconductive coil; and
a track that includes the ferromagnetic body,
the movable body being so constituted as to move along the track and to slide in a direction of the center axis of the superconductive coil,
wherein the movable body is floated and supported relative to the other by the axial magnetic attraction caused by the center plane of the superconductive coil and the center plane of the ferromagnetic body moving apart from each other.

* * * * *